United States Patent [19]

Perry

[11] 3,869,807
[45] Mar. 11, 1975

[54] METHOD FOR CREATING INERT GAS BARRIER FOR PRODUCT FEED CONDUIT

[75] Inventor: Robert J. Perry, Houston, Tex.

[73] Assignee: Phillips Petroleum Company, Bartlesville, Okla.

[22] Filed: July 30, 1973

[21] Appl. No.: 383,721

[52] U.S. Cl.................................. 34/33, 34/242
[51] Int. Cl................................... F26b 3/00
[58] Field of Search........ 214/17 B; 34/33, 236, 242

[56] References Cited
UNITED STATES PATENTS

| | | | |
|---|---|---|---|
| 3,152,872 | 10/1964 | Scoggin et al. | 34/242 X |
| 3,190,509 | 6/1965 | Kirchhoefer | 214/17 B |
| 3,279,087 | 10/1966 | Hearne et al. | 34/12 |
| 3,421,229 | 1/1969 | Kniese | 34/236 X |
| 3,612,144 | 10/1971 | Marcum et al. | 159/3 X |
| 3,724,090 | 4/1973 | Smith, Jr. | 34/57 D |

*Primary Examiner*—Charles J. Myhre
*Assistant Examiner*—William Anderson

[57] ABSTRACT

In an operation in which a vapor lock system is employed consisting essentially of two star valves, butterfly valves or the like for transferring solid particulate product from one point in the operation to another and wherein a minimum loss of valuable reactant with purge gas introduced between the valves is desired the improvement permitting reduced amount of purge gas and other advantages which comprises introducing purge gas down stream of the down stream valve.

5 Claims, 1 Drawing Figure

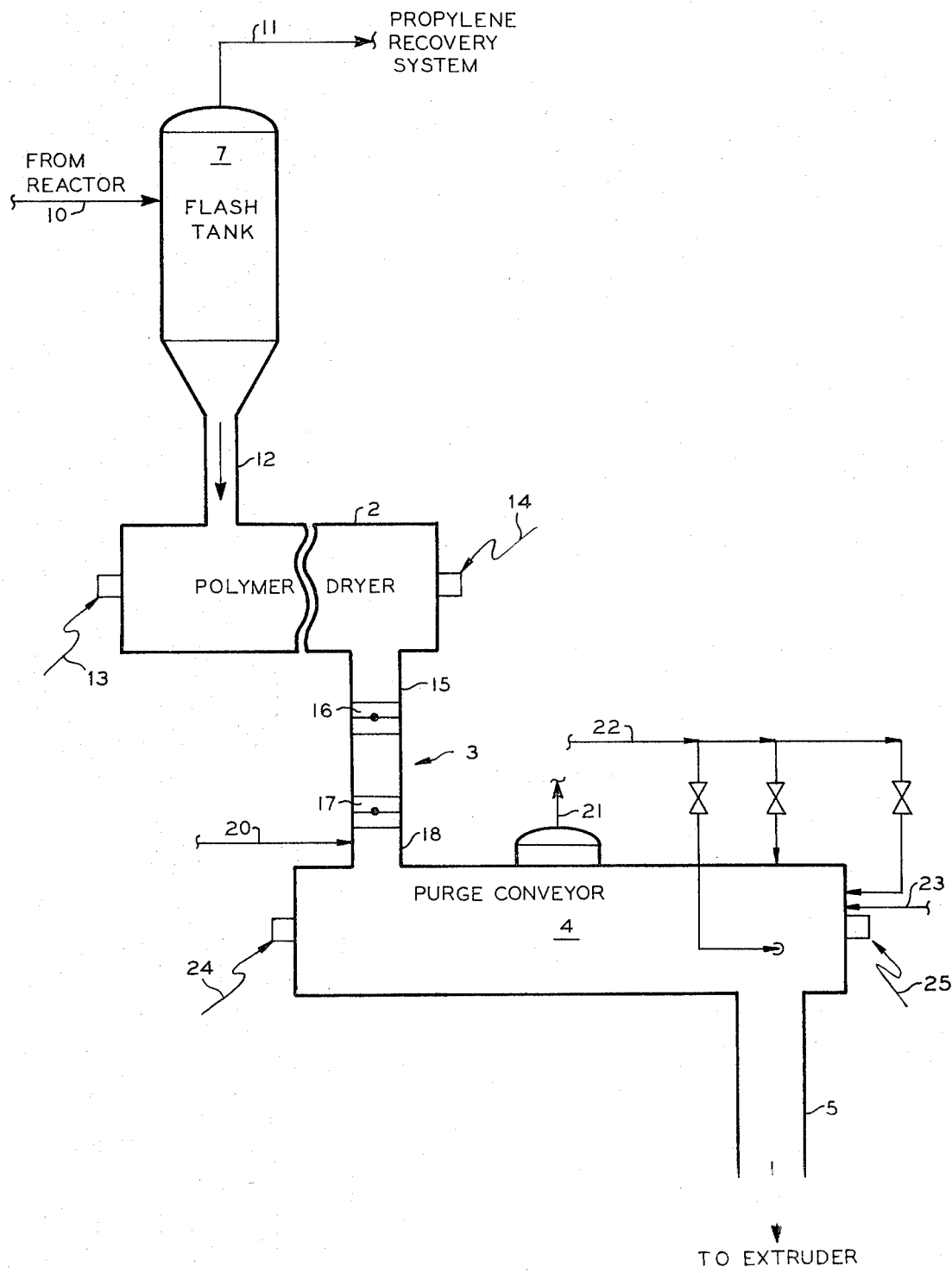

METHOD FOR CREATING INERT GAS BARRIER FOR PRODUCT FEED CONDUIT

This invention relates to transfer of solids. In one of its aspects it relates to the transfer of a mass of particulate material from one section of an operation to another section while avoiding undue gas or vapor travel employing an inert or other gas in conjunction with a vapor lock consisting essentially of a plurality of valves, e.g., star valves, butterfly valves, etc. In another of its aspects, the invention relates to the handling of solids, for example, a solid polymeric material such as particulate polyolefin, e.g., polypropylene to remove from it entrained diluent vapors, e.g., propylene vapors and transferring the solids from one section of an apparatus to another section by means of a vapor lock consisting essentially of a plurality of valves, as described herein.

In one of its concepts, the invention provides a method for the transfer of particulate solids which may be accompanied by vapors through an interlock system through which gases tend to flow, the interlock system consisting essentially of a plurality of valves or equivalently functioning elements, the solids moving generally in a downwardly direction through said valves, stepwise, the valves opening sequentially rather than simultaneously, which comprises injecting a gas, usually a purge gas, to a point just below the lower most of said valves or elements, thus to prevent undue passing of vapors upwardly through the lower most or lower elements while reducing the total amount of gas required to be injected and obtaining other advantages as herein set forth and described. In another of its concepts, the invention provides an apparatus consisting essentially of an interlock system as herein described and means for suitably injecting the purge gas to a point just below the lower most element or valve, also as herein set forth and described. In a more specific concept of the invention, it provides method and apparatus for conveying particulate solids, e.g., polyolefin solids such as polypropylene particulates or fluff upon its recovery from a catalyzed polymerization in the presence of a diluent which can be propylene, the solids being conveyed as from a polymer dryer to which the solids have been passed from a flash tank for removing a substantial portion of accompanying diluent, the solids being conveyed from the polymer dryer being conveyed to a purge conveyor, at lower pressure, the conveying being effected through an interlock system to avoid loss of propylene vapor, the interlock system consisting essentially of a plurality of valves such as star valves or butterfly valves which normally open sequentially thus to stepwise move the solids usually downwardly from the polymer dryer to the purge conveyor, inert purge gas being injected according to the concept just below the lower most valve and therefore flowing largely into and through the purge conveyor to a vent therefrom rather than upwardly into and with the propylene vapors, thereby avoiding contamination of the propylene in the propylene recovery system and concomitant loss of propylene when the purge gas is removed from the system at the propylene recovery part thereof.

Although the invention has wide applicability as one skilled in the art having possession of this disclosure and having studied the same will understand, it will now be further described in connection with the recovery of solid polypropylene to which it has been applied successfully as evident from this disclosure.

In U.S. Pat. No. 3,279,087, Oct. 18, 1966, R. A. Hearne, R. G. Wallace and Ralph Cox and in U.S. Pat. No. 3,612,144, Oct. 12, 1971, R. B. Marcum and G. K. Chandler, there are disclosed operations in which solid, particulate polymer or polyolefin is recovered from a diluent. As evident in the drawings of these patents, solid polymer passes from a flash vessel or dryer to an auger or screw conveyor dryer and from there to a purge column or chamber. For purposes of the present disclosure, the purge chamber or column can be replaced by a purge conveyor. In the patents, between the dryers and the purge vessel, in the conduits connecting the same, are seen rotary star-type valves. Injected between these valves is an inert gas "seal." The gas is introduced at a pressure sufficient to prevent passing of diluent or hydrocarbon vapor from the dryer to the purge vessels.

The disclosures of the patents are incorporated herein by reference. The drawing which forms a part of this specification essentially shows the same kind of arrangement of the valves used to produce a vapor lock between the dryer and the purge vessels to prevent the flow of hydrocarbon vapor from the dryer to the purge vessel. However, as later described, the purge gas is not introduced to a point between the valves. It is introduced to a point just below the lower valve.

I have now discovered that such introduction of the purge gas is accompanied by certain advantages. The concomitant advantages include a significant reduction of the total purge gas needed and therefore, the amount of polymer, or propylene lost with the purge gas when it is released from the flashing operation and the propylene recovery system — the amount of propylene in a purge gas released from the system from the propylene recovery being as high as about 65 percent, with the remainder consisting essentially of nitrogen and reduction and loss of fines from the purge conveyor owing at least in part to the reduction of purge gas, introduced as described.

The production of solid polypropylene in the presence of a catalyst and in a diluent, e.g., propylene liquid is known and described in the literature.

However, for purposes of further illustrating and describing of the invention reference is now made to the Drawing in which there are provided a flash tank 1, a polymer dryer 2, a transfer conduit 3, a purge conveyor 4 and a discharge to extruder 5. A reaction effluent from a reactor enters the system at 10 and in flash tank 1 is flashed, ordinarily, at a pressure of from about 4 to 5 psig and at a temperature of from about 100° to about 150°F propylene diluent vapors being taken overhead at 11 to a propylene recovery system not shown for sake of simplicity. Solid polymer from which a substantial portion but not all of the propylene diluent has been flashed in flash tank 1 is now passed by conduit 12 to polymer dryer 2. Air leakage into this paddle equipped dryer is prevented by sealing the bearing with inert gas at 13 and 14 at a pressure higher than in the dryer and outside air. The polymer is dried at a pressure of approximately four pounds per square inch gauge and reaches a temperature of about 240°F as it is discharged into the upper portion of transfer pipe marked 15. The polymer collects above a first butterfly valve 16 and when this valve opens the polymer collects above a second butterfly valve 17. The valves are opened as known in the art in sequential manner. Thus, a mass of polymer accumulated on butterfly valve 16 is let fall onto butterfly valve 17. Valve 16 then is closed and valve 17 is opened whereupon the accumulated polymer on valve 17 is let fall into purge conveyor 4 through section 18.

According to the invention, a purge gas 20 is introduced into section 18 just below butterfly valve 17. A substantial portion of this purge gas passes down into and across purge conveyor 4 and passes out together with gases vented at 21 and with some steam and a further small quantity of inert purge gas introduced at 22 and 23, respectively. Finally, the purged solid polymer particles are removed at 5 to an extruder, not shown for sake of simplicity. The bearings in the purge conveyor are likewise sealed with inert gas at 24 and 25 to prevent infiltration of air.

Returning to the injection of the inert purge gas at 20, some of this gas will pass upwardly through the two butterfly valves and into the polymer dryer and ultimately from there through the flash tank through the propylene recovery system and to be vented. According to the invention, as described, considerably less inert purge gas is needed when it is injected below the lowermost butterfly valve rather than between the butterfly valves. Also, as will be understood by one skilled in the art in possession of this disclosure having studied the same by use of a lower amount of purge gas there will be less loss of fines at vent 21 because the loss of fines is proportional to the total flow of gas through the vent.

As known in the art, the steam in the purge conveyor accomplishes completion of the hydrolysis of any remaining catalyst. Entry of such corrosive vapors into the propylene recovery and purification system is undesirable. According to the invention, the use of less inert purge gas makes possible the reduction of the amount of corrosive vapors entering into the propylene recovery system by upward migration through the apparatus.

Prior to the invention, there was introduced cyclically between the two butterfly valves whenever the top valve was closed approximately 15 cubic feet per minute of inert gas to minimize entrance to corrosive vapors to the dryer and loss of propylene from the dryer. According to the invention not only has the use of this stream of inert gas been discontinued at all times but there is used only about 5 cubic feet per minute of inert gas under the lower butterfly valve 17. The total inert gas used, according to the invention is less than the quantity used in the prior art here discussed. However importantly the functioning of the invention permits less loss of propylene when venting the purge gas from the system.

The purging of the vapor lock system affects the following items:

1. The amount of inert purge gas that must be removed from the propylene sent to the propylene recovery and purification unit as described.
2. The amount of propylene lost from the dryer in discharging polymer to the purge conveyor.
3. The amount of inert purge gas supplied in purging the vapor lock.
4. The volume of vapors admitted from the purge conveyor to the dryer.
5. Other minor effects such as consumption of utilities on the inert gas column in propylene purification and the blowing of fines from the purge conveyor, also as discussed.

It will be understood by one skilled in the art that the drawing is diagrammatic in character and is not drawn to scale. The various sizes and proportions of equipment currently used or as these may be designed are within the routineer's skill.

The table below compares the prior method of operation with the method according to the invention. In connection with the table it should be noted that in connection with the prior operation that the inert purge gas has swept polymer solids and propylene vapors from the vapor lock during the time the top valve was closed and the bottom valve was open. When the top valve was opened, the heavier propylene, i.e., propylene being heavier than nitrogen, and polymer solids displaced inert purge gas up into the polymer solids dryer to be eventually passed to the propylene purification unit, causing a loss of propylene there, as earlier described. With the purge gas entering the system under the lower butterfly valve and at a lower pressure than in the dryer, exchange of vapor, according to the invention, will occur only when the lower butterfly valve is opened; principally due to the differential pressure expansion of the propylene.

| | Consumption Differences In Propylene and Inert Gas For 4500 No./hr Polymer Solids Feed to Dryer | |
|---|---|---|
| | Prior Method<br>Seal Gas Between Butterfly Valves | Present Method Using Invention<br>Seal Gas Below Bottom Butterfly |
| Propylene lost with inert gas in removal from system lbs/hr | 14.7 | 0 |
| Propylene lost into purge dryer lbs/hr | 28.2 | 5 |
| Inert gas consumption for seal — std. cu. ft./min. | 450 | 300 |

Reasonable variation and modification are possible within the scope of the foregoing disclosure, drawing and the appended claims the essence of which is that in an operation as described in which solids are transferred through a vapor lock system a purge gas formerly introduced between two butterfly or star valves is introduced below the lower of the valves with concomitant savings of purge gas, reduction of loss of fines, and, importantly, reduction of loss of expensively obtained reactant such as monomer, e.g., propylene monomer as in the production of solid polypropylene with which the invention has been illustrated.

I claim:

1. In a system for the transfer of a mass of particulate solids to a receptacle through a vapor lock system consisting essentially of a transfer conduit and at least two butterfly or star-type valves which are opened sequentially a method for minimizing the introduction of vapors into the vapor lock system comprising introducing purge gas into the transfer conduit at a point below the lower most valve and above the lower end of the transfer conduit.

2. The method according to claim 1 in which the particulate solids are polypropylene solids which have been flashed to remove diluent and then substantially dried prior to being passed to the vapor lock system.

3. The method of claim 1 wherein the pressure beneath the lower most valve is substantially lower than that existing above the vapor lock system.

4. The method of claim 2 wherein the pressure beneath the lower most valve is substantially lower than that existing above the vapor lock system.

5. A method for recovering polymer solids from a polymerization effluent which comprises flashing hydrocarbon diluent from the effluent, withdrawing the flashed hydrocarbons from the flashed zone, passing the polymer solids from said flashed zone to a drying zone by way of a connecting conduit, passing the substantially dried polymer to a transfer conduit containing two butterfly or star-type valves, introducing a purge gas into the transfer conduit at a point just below the lower most valve and above the end of the transfer conduit, opening the first valve while the second valve is closed to allow polymer to pass to the second valve, closing the first valve, opening the second valve to allow solids to pass from the transfer conduit to a purge conveyor, passing the solids from the purge conveyor to a point of collection.

* * * * *